United States Patent
Fujimaki et al.

(10) Patent No.: US 12,365,033 B2
(45) Date of Patent: Jul. 22, 2025

(54) NOZZLE AND ADDITIVE MANUFACTURING APPARATUS

(71) Applicant: Shibaura Machine Co., Ltd., Chiyoda-ku (JP)

(72) Inventors: Shimpei Fujimaki, Mishima (JP); Yasushi Fukase, Numazu (JP)

(73) Assignee: Shibaura Machine Co., Ltd., Chiyoda-ku (JP)

( * ) Notice: Subject to any disclaimer, the term of this patent is extended or adjusted under 35 U.S.C. 154(b) by 765 days.

(21) Appl. No.: 17/629,261

(22) PCT Filed: Jul. 1, 2020

(86) PCT No.: PCT/JP2020/025866
§ 371 (c)(1),
(2) Date: Jan. 21, 2022

(87) PCT Pub. No.: WO2021/020011
PCT Pub. Date: Feb. 4, 2021

(65) Prior Publication Data
US 2022/0250158 A1  Aug. 11, 2022

(30) Foreign Application Priority Data
Jul. 31, 2019  (JP) .................... 2019-141158

(51) Int. Cl.
*B22F 12/53* (2021.01)
*B22F 12/40* (2021.01)
*B33Y 30/00* (2015.01)

(52) U.S. Cl.
CPC .............. *B22F 12/53* (2021.01); *B22F 12/40* (2021.01); *B33Y 30/00* (2014.12)

(58) Field of Classification Search
CPC .................. B22F 12/53; B22F 12/40
See application file for complete search history.

(56) References Cited

U.S. PATENT DOCUMENTS 5,418,350 A * 5/1995 Freneaux ............ B23K 26/144
219/121.84
5,477,026 A * 12/1995 Buongiorno ......... B23K 26/144
219/121.84
(Continued)

FOREIGN PATENT DOCUMENTS

CN  103201202 A   7/2013
CN  106068165 A   11/2016
(Continued)

OTHER PUBLICATIONS

Machine translation of CN-108127118-A, Mar. 2025 (Year: 2025).*
(Continued)

*Primary Examiner* — Geoffrey S Evans
(74) *Attorney, Agent, or Firm* — Oblon, McClelland, Maier & Neustadt, L.L.P.

(57) ABSTRACT

A nozzle includes a nozzle member includes a first passage, a second passage surrounding the first passage and configured to eject powder and fluid from an end portion, a diffusion room apart from the end portion and configured to supply the powder and the fluid to the second passage, and a supply path to supply the powder and the fluid to the diffusion room. A first inner surface of the nozzle member includes a first curved surface in a conical shape having a diameter decreasing toward the end portion. A second inner surface of the nozzle member includes a second curved surface in a conical shape having a diameter decreasing toward the end portion. The second passage is formed between the first curved surface and the second curved surface. The diffusion room is formed between the first inner surface and the second inner surface.

10 Claims, 12 Drawing Sheets

(56) References Cited

U.S. PATENT DOCUMENTS

| | | | |
|---|---|---|---|
| 2015/0196975 A1* | 7/2015 | Sato | B23K 26/342 239/135 |
| 2017/0014909 A1 | 1/2017 | Tanaka et al. | |
| 2017/0050268 A1 | 2/2017 | Fujiya et al. | |
| 2017/0120517 A1* | 5/2017 | Shimoyama | B05B 7/16 |
| 2019/0091926 A1 | 3/2019 | Ohno et al. | |

FOREIGN PATENT DOCUMENTS

| | | | |
|---|---|---|---|
| CN | 107075687 A | | 8/2017 |
| CN | 108127118 A | * | 6/2018 |
| CN | 108500262 A | | 9/2018 |
| CN | 109421269 A | | 3/2019 |
| CN | 109513923 A | | 3/2019 |
| DE | 693 00 757 T2 | | 6/1996 |
| DE | 10 2017 215 841 A1 | | 3/2019 |
| JP | 10-501463 A | | 2/1998 |
| JP | 2005-219060 A | | 8/2005 |
| JP | 2015-196249 A | | 11/2015 |
| JP | 2017-19018 A | | 1/2017 |
| JP | 2019-59114 A | | 4/2019 |
| WO | WO 2016/151781 A1 | | 9/2016 |

OTHER PUBLICATIONS

Japanese Office Action issued Nov. 15, 2022 in Japanese Patent Application No. 2019-141158 (with English Translation), 3 pages.

International Search Report mailed on Sep. 4, 2020 in PCT/JP2020/025866 filed on Jul. 1, 2020, 2 pages).

Combined Chinese Office Action and Search Report issued Mar. 16, 2023, in corresponding Chinese Patent Application No. 202080054726.7 (with English Translation and English Translation of Category of Cited Documents), 11 pages.

Germany Office Action issued Feb. 17, 2025, corresponding Germany Patent Application No. 11 2020 003 632.4 (with English translation), 7 pages.

* cited by examiner

NOZZLE AND ADDITIVE MANUFACTURING APPARATUS

CROSS-REFERENCE TO RELATED APPLICATIONS

This application is a national stage application of International Application No. PCT/JP2020/025866, filed Jul. 1, 2020, which designates the United States, incorporated herein by reference, and which claims the benefit of priority from Japanese Patent Application No. 2019-141158, filed Jul. 31, 2019, the entire contents of each of which are incorporated herein by reference.

TECHNICAL FIELD

Embodiments of the present invention relate to a nozzle and an additive manufacturing apparatus.

BACKGROUND ART

Additive manufacturing apparatuses are known, which supply a powdered material from a nozzle and emit laser light to solidify the material and form layers of the solidified material. The layers of the solidified material are deposited, whereby a three-dimensional object is produced by additive manufacturing.

The nozzle is sometimes directed vertically downward as well as obliquely or horizontally. For example, the nozzle has a large number of holes for ejecting a material in order to prevent uneven distribution of the material ejected by the nozzle due to gravity.

CITATION LIST

Patent Literature

Patent Document 1: Japanese Patent Application Laid-open No. 2005-219060

SUMMARY OF INVENTION

Problem to be Solved by the Invention

When a powered material is ejected from a large number of holes, the cross section of each hole is small. The inside of the nozzle therefore may be clogged with the material.

An example of the problem to be solved by the present invention is to provide a nozzle and an additive manufacturing apparatus capable of suppressing clogging with powder.

Means for Solving Problem

A nozzle according to an embodiment includes a nozzle member, a first inner surface, and a second inner surface. The nozzle member includes an end portion in a first direction, and is provided with a first passage configured to emit an energy beam from the end portion, a second passage surrounding the first passage and configured to eject powder and fluid from the end portion, a diffusion room spaced apart from the end portion in a second direction opposite to the first direction and configured to supply the powder and the fluid to the second passage, and a supply path configured to supply the powder and the fluid to the diffusion room. The first inner surface is provided on the nozzle member and includes a first curved surface in a conical shape having a diameter decreasing toward the end portion. The second inner surface is provided on the nozzle member, faces the first inner surface with a gap interposed, and including a second curved surface in a conical shape having a diameter decreasing toward the end portion, the second passage is formed between the first curved surface and the second curved surface, and the diffusion room is formed between the first inner surface and the second inner surface. A distance between the first inner surface and the second inner surface in the diffusion room is longer than a distance between the first curved surface and the second curved surface in the second passage.

DESCRIPTION OF EMBODIMENTS

First Embodiment

A first embodiment will be described below with reference to FIG. 1 to FIG. 5. In the present description, basically, the vertically upward direction is defined as the upward direction and the vertically downward direction is defined as the downward direction. In the present description, constituent elements according to embodiments and a description of the elements may be provided in a plural form. The constituent elements and the description thereof are merely illustrative and are not limited by the wording in the present description. The constituent elements may be identified by names different from those in the present description. The constituent elements can be described by wording different from the wording in the present description.

Figure 1:
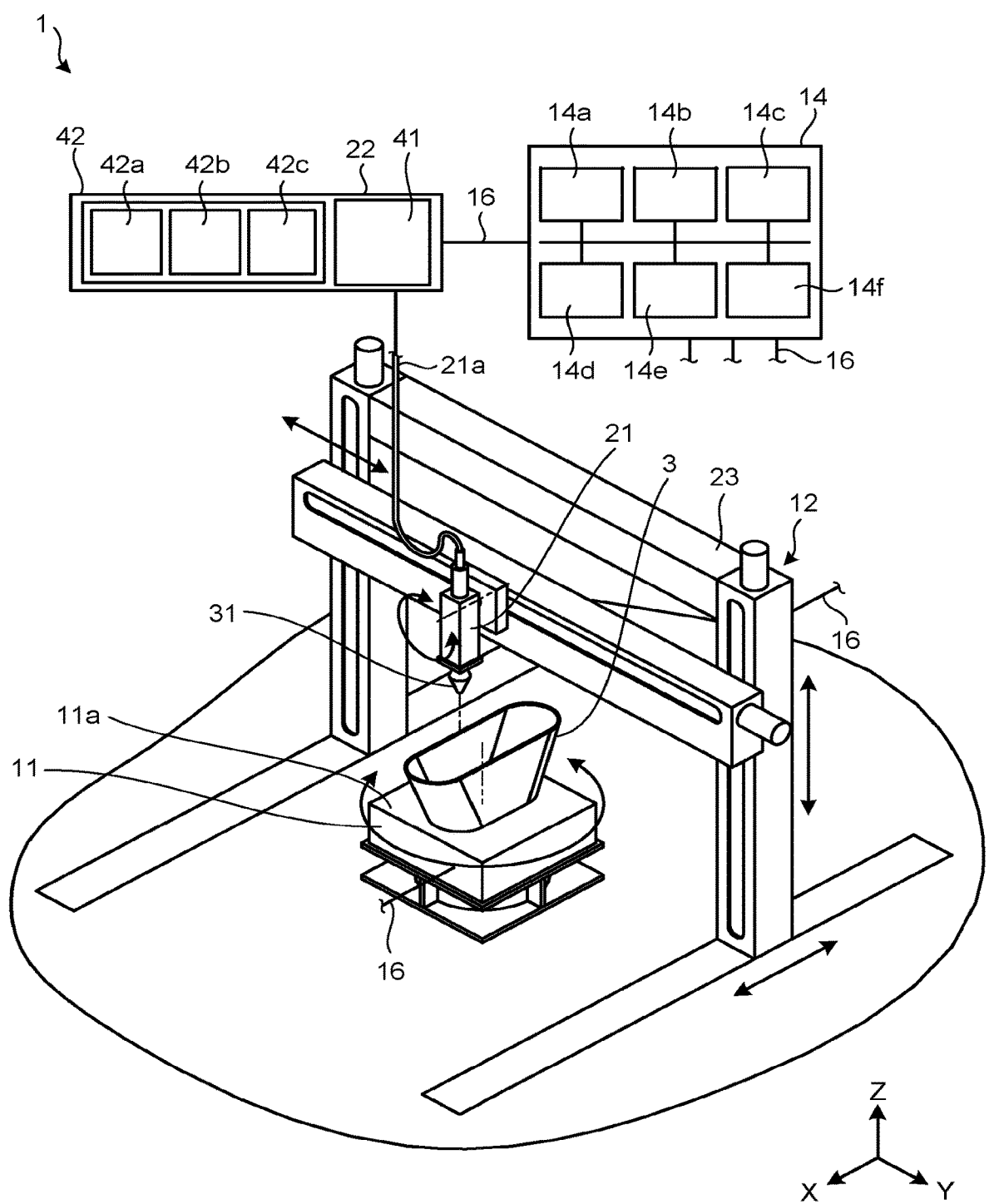
FIG. 1 is an exemplary perspective view schematically illustrating an additive manufacturing system according to a first embodiment.

FIG. 1 is an exemplary perspective view schematically illustrating an additive manufacturing system 1 according to the first embodiment. The additive manufacturing system 1 is an example of the additive manufacturing apparatus. The additive manufacturing system 1 is a system including a three-dimensional printer of commonly called a directed energy deposition (DED) method or laser metal deposition (LMD) method. The additive manufacturing system 1 is not limited to these examples.

As illustrated in FIG. 1, in the present description, the X axis, the Y axis, and the Z axis are defined. The X axis, the Y axis, and the Z axis are orthogonal to each other. The Z axis extends, for example, in the vertical direction. The X axis and the Y axis extend, for example, in the horizontal direction. The additive manufacturing system 1 may be disposed such that the Z axis obliquely intersects the vertical direction.

Figure 2:
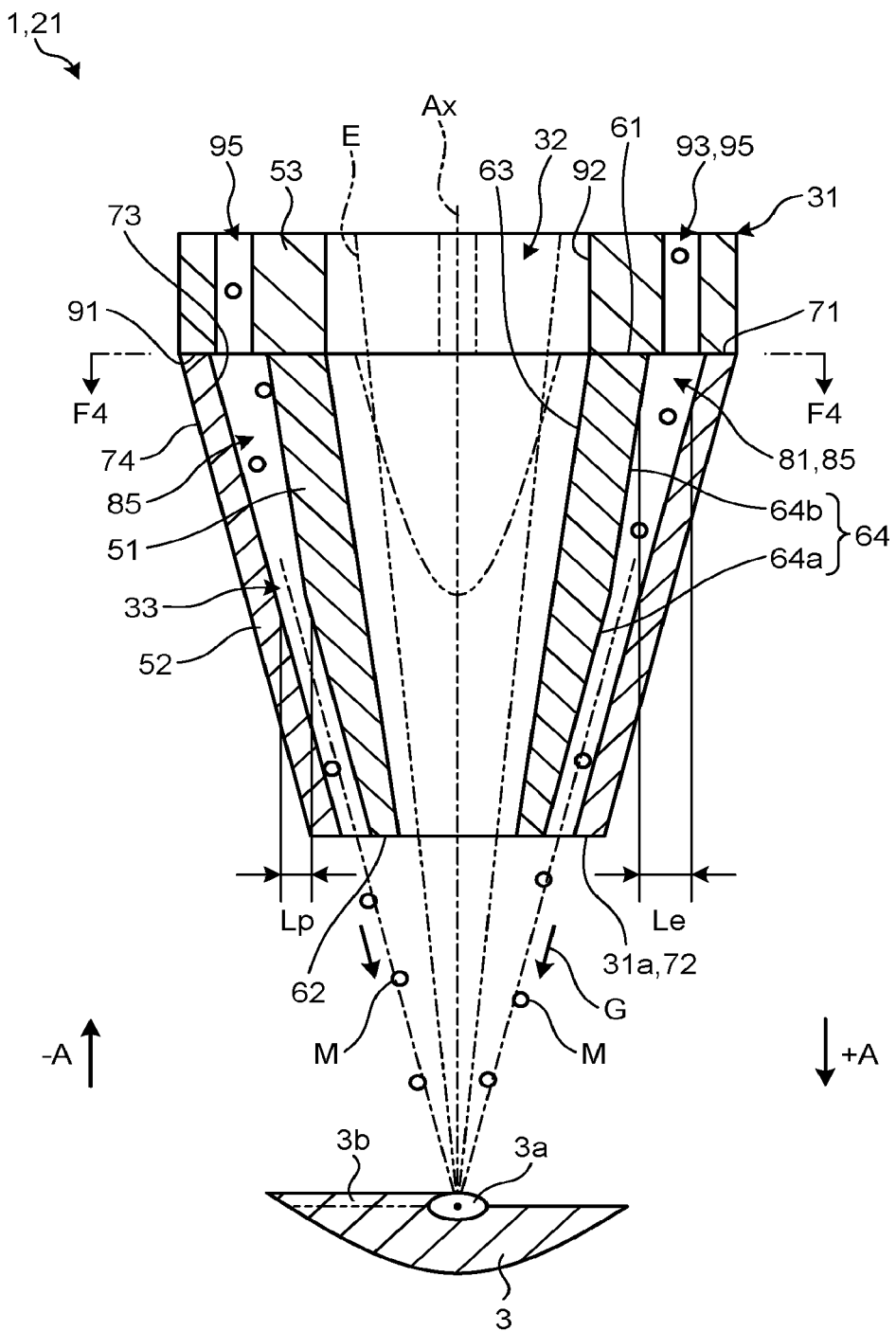
FIG. 2 is an exemplary cross-sectional view schematically illustrating a part of the additive manufacturing system in the first embodiment and an object.

FIG. 2 is an exemplary cross-sectional view schematically illustrating a part of the additive manufacturing system 1 in the first embodiment and an object 3. The additive manufacturing system 1 produces the object 3 having a predetermined shape by additive manufacturing (additive fabrication), for example, by stacking a powdered material M in layers. The material M is an example of powder.

As illustrated in FIG. 1, the additive manufacturing system 1 includes a table 11, a modeling unit 12, a control unit 14, and a plurality of signal lines 16. The table 11, the modeling unit 12, and the control unit 14 are disposed, for example, inside a housing of the additive manufacturing system 1 or inside a room for modeling.

The table 11 has a support surface 11a. The support surface 11a is formed substantially flat and faces the +Z direction (the direction indicated by the arrow in the Z axis, the upward direction). The support surface 11a supports the object 3 produced by additive manufacturing, a workpiece of the object 3, and a base on which the material M is deposited. In the following description, the object 3 includes the object 3 finished by additive manufacturing, the workpiece of the object 3, and the base. At least a part of the table 11 is rotated so that the table 11 can rotate the object 3 supported on the support surface 11a around the center of rotation parallel to the Z axis.

The table 11 may move the object 3 in the X direction, the Y direction, and the Z direction. The table 11 may further rotate the object 3 around the center of rotation parallel to the Y axis or around the center of rotation parallel to the X axis.

The modeling unit 12 supplies the material M and stacks the material M on the support surface 11a or the base supported on the support surface 11a. The material M is, for example, powder of metal such as titanium. The material M is not limited thereto and may be other materials such as other metals, synthetic resins, and ceramics. The additive manufacturing system 1 may produce the object 3 by additive manufacturing with different kinds of materials M.

The modeling unit 12 includes a nozzle 21, a supply device 22, and a moving device 23. The nozzle 21 ejects the material M onto the support surface 11a of the table 11 or the object 3 on the support surface 11a. As illustrated in FIG. 2, an energy beam E is emitted from the nozzle 21 toward the ejected material M and the object 3 on the support surface 11a. The energy beam E is, for example, laser light.

Laser light serving as the energy beam E is emitted from the nozzle 21 concurrently with the supply of the material M. The nozzle 21 may emit other energy beams E rather than laser light. The energy beam E may be any beam such as laser light that melts or sinters the material M and, for example, may be an electronic beam or electromagnetic waves in the microwave or ultraviolet region.

The modeling unit 12 heats the base and the ejected material M by the energy beam E and forms a melting region (bead) 3a. The nozzle 21 irradiates the material M with the energy beam E in the melting region 3a to melt or sinter the material M and agglomerate the material M. In this way, the melting region 3a may include not only the supplied material M but also the base or a part of the object 3 irradiated with the energy beam E. The melting region 3a is not limited to the completely melted material M and may be melted parts of material M fused to each other.

The melting region 3a is solidified to form a layer 3b as an agglomerate of the material M in the form of a layer or a thin film on the base or the object 3. The material M may be cooled through heat transfer to the agglomerate of the material M and thereby deposited in a granular form to form a granular agglomerate (layer).

The modeling unit 12 may perform annealing treatment by emitting the energy beam E toward the agglomerate of the material M from the nozzle 21. The agglomerate of the material M may be remelted or resintered by the energy beam E and solidified into the layer 3b.

The modeling unit 12 produces the object 3 by additive manufacturing by modeling the layer 3b repeatedly. In this way, the nozzle 21 of the modeling unit 12 emits the energy beam E to melt or sinter the material M to model the layer 3b and repeatedly performs modeling of the layer 3b, whereby the object 3 supported on the support surface 11a is produced by additive manufacturing.

The nozzle 21 includes a nozzle head 31. The nozzle head 31 is an example of the nozzle member. A distal end 31a of the nozzle head 31 faces the object 3 with a gap interposed. The distal end 31a is an example of the end portion.

The nozzle head 31 has an emission path 32 and an ejection path 33. The emission path 32 is an example of the first passage. The ejection path 33 is an example of the second passage. The emission path 32 and the ejection path 33 are open, for example, to the distal end 31a.

The emission path 32 is a hole having a substantially circular cross section. The energy beam E is emitted to the outside of the nozzle head 31 through the emission path 32. In other words, the emission path 32 allows the energy beam E to be emitted from the distal end 31a.

The ejection path 33 is a hole having a substantially annular cross section that surrounds the emission path 32. The material M and a carrier gas G are ejected to the outside of the nozzle head 31 through the ejection path 33. In other words, the ejection path 33 ejects the material M and the carrier gas G from the distal end 31a. The carrier gas G is an example of fluid and, for example, an inert gas such as nitrogen or argon. The carrier gas G may be any other fluid.

The nozzle 21 may further include a passage to eject shield gas. The passage surrounds the ejection path 33 and ejects shield gas from the distal end 31a or another part of the nozzle head 31. The shield gas is, for example, an inert gas such as nitrogen or argon.

As illustrated in FIG. 1, the supply device 22 includes an emission device 41 and a material supply device 42. The emission device 41 is, for example, an optical device and includes a light source and an optical system. The light source has an oscillator and emits laser light as the energy beam E through oscillation by the oscillator. The light source can change the output (power) of the emitted energy beam E.

The light source allows the emitted energy beam E to be incident on the optical system. The energy beam E enters the nozzle 21 through the optical system. The optical system can change the spot diameter of the energy beam E. The emission device 41 supplies the energy beam E to the emission path 32 of the nozzle 21 and allows the energy beam E to be emitted from the emission path 32. The emission device 41 is not limited to an optical device capable of emitting laser light and may be a device that generates other energy beams E.

The nozzle 21 heats the ejected material M by radiation of the energy beam E to form the layer 3b of the material M and can also perform annealing treatment. The nozzle 21 can remove an unnecessary part of the object 3 by radiation of the energy beam E.

The material supply device 42 includes a material supply unit 42a, a material tank 42b, and a gas tank 42c. The material tank 42b contains the material M. The material supply device 42 may include a plurality of material tanks 42b that contain different kinds of materials M. The gas tank 42c contains the carrier gas G.

The material supply unit 42a supplies the material M in the material tank 42b to the nozzle 21 using the carrier gas G in the gas tank 42c through a supply tube 21a. The nozzle 21 thus ejects the material M and the carrier gas G from the ejection path 33. The material supply unit 42a can change the amount of material M ejected from the nozzle 21 per unit time and the speed of the ejected material M.

The material supply unit 42a includes, for example, a compressor to feed the carrier gas G in the gas tank 42c to the supply tube 21a and a device that supplies the material M in the material tank 42b to the flow of the carrier gas G. The material supply unit 42a may supply the material M to the nozzle 21 by any other means.

The supply tube 21a connects the nozzle 21 to the emission device 41 and the material supply device 42. The supply tube 21a includes a tube through which the material M and the carrier gas G pass and a cable through which the energy beam E passes.

The moving device 23 moves and rotates the nozzle 21. For example, the moving device 23 can translate the nozzle 21 in the X direction, the Y direction, and Z direction and rotate the nozzle 21 around the center of rotation parallel to the X axis.

The moving device 23 can move the nozzle 21 relative to the support surface 11a and change the orientation of the nozzle 21. The moving device 23 can change the moving speed of the nozzle 21 with respect to the support surface 11a. The table 11 may move and rotate so that the nozzle 21 may move relative to the support surface 11a and the orientation of the nozzle 21 with respect to the support surface 11a may change.

The control unit 14 is electrically connected to the table 11 and the modeling unit 12 through the signal lines 16. The control unit 14 may be, for example, a control unit provided integrally with the modeling unit 12 or may be a computer provided separately from the modeling unit 12.

The control unit 14 has a hardware configuration, for example, using a common computer, including a control device such as a central processing unit (CPU) 14a, a read only memory (ROM) 14b, a random access memory (RAM) 14c, an external storage device 14d, an output device 14e, and an input device 14f. The CPU 14a, the ROM 14b, the RAM 14c, the external storage device 14d, the output device 14e, and the input device 14f are connected to each other through a bus or an interface.

The CPU 14a executes a program such as an NC program loaded in the ROM 14b or the external storage device 14d so that the control unit 14 controls each unit of the additive manufacturing system 1. For example, the control unit 14 controls the table 11 and the nozzle 21, the moving device 23, the emission device 41, and the material supply device 42 of the modeling unit 12.

The ROM 14b stores a program and data necessary for execution of the program. The RAM 14c functions as a working area during execution of the program. The external storage device 14d is, for example, a device that can store, change, or delete data, such as a hard disk drive (HDD) or a solid state drive (SSD). The output device 14e is, for example, a display and a speaker. The input device 14f is, for example, a keyboard and a mouse.

The nozzle 21 will be described in detail below. As illustrated in FIG. 2, the nozzle head 31 has a center axis Ax. The center axis Ax in the present embodiment is a virtual center axis of the emission path 32 and the ejection path 33. Specifically, the emission path 32 and the ejection path 33 are disposed on the center axis Ax or coaxially around the center axis Ax.

The center axis Ax is the virtual center axis of a rotation-symmetric part of the emission path 32 and the ejection path 33. Thus, even when the emission path 32 and the ejection path 33 have an asymmetric part such as a protrusion or a depression, the center axis Ax is still the center axis of the rotation-symmetric part of the emission path 32 and the ejection path 33.

Hereinafter, one direction along the center axis Ax is defined as +A direction, and the direction opposite to the +A direction is defined as −A direction. The +A direction is an example of the first direction. The −A direction is an example of the second direction.

Hereinafter, a direction orthogonal to the center axis Ax is defined as radial direction, and a direction of rotation around the center axis Ax is defined as circumferential direction. To put it another way, the center axis Ax extends in the +A direction and/or the −A direction.

The distal end 31a of the nozzle head 31 faces the +A direction. The distal end 31a is an end portion of the nozzle head 31 in the +A direction. As described above, the orientation of the nozzle 21 is changed by the moving device 23. The +A direction and the −A direction therefore can change with respect to the X axis, the Y axis, and the Z axis. In the example in FIG. 2, the distal end 31a faces downward, and the +A direction agrees with the −Z direction (the direction opposite to the arrow in the Z axis, the downward direction). The moving device 23 enables the distal end 31a to face the +Z direction, the X direction, the Y direction, or any other directions.

The nozzle head 31 has a first tubular wall 51, a second tubular wall 52, and a proximal portion 53. The first tubular wall 51, the second tubular wall 52, and the proximal portion 53 may be formed integrally or may be formed separately. The first tubular wall 51, the second tubular wall 52, and the proximal portion 53 are formed of, for example, metal or may be formed of any other material such as resin or ceramic.

The first tubular wall 51 is formed in a substantially cylindrical shape extending along the center axis Ax. The first tubular wall 51 has a proximal end 61, a distal end 62, an inner surface 63, and a first forming surface 64. The first forming surface 64 is an example of the first inner surface.

The proximal end 61 is an end of the first tubular wall 51 in the −A direction. The proximal end 61 is, for example, a substantially flat and substantially annular surface facing the −A direction. The distal end 62 is an end of the first tubular wall 51 in the +A direction. The distal end 62 is, for example, a substantially flat and substantially annular surface facing the +A direction. The distal end 62 forms a part of the distal end 31a of the nozzle head 31. The distal end 62 may be different from the distal end 31a of the nozzle head 31.

The inner surface 63 is a substantially conical curved surface facing the center axis Ax. In the present embodiment, the conical curved surface refers to a cylindrical surface having a diameter gradually reducing toward one direction along the center axis and includes a curved surface such as a side surface of a cone with a minimum diameter of zero and a curved surface such as a side surface of a truncated cone with a minimum diameter greater than zero. The inner surface 63 extends between an edge of the proximal end 61 and an edge of the distal end 62 on the inside in the radial direction. The inner surface 63 forms a part of the emission path 32. To put it another way, a part of the emission path 32 is formed inside the inner surface 63.

In the present embodiment, the inner surface 63 is a curved surface in a conical shape having a diameter decreasing toward the distal end 62 (distal end 31a). More specifically, the diameter of the edge of the proximal end 61 on the inside in the radial direction is larger than the diameter of the edge of the distal end 62 on the inside in the radial direction. The diameter of the inner surface 63 is not limited to this example and may be, for example, constant or may increase toward the distal end 62.

The first forming surface 64 is an outer surface of the substantially cylindrical first tubular wall 51 and positioned on the side opposite to the inner surface 63. The first forming surface 64 extends between an edge of the proximal end 61 and an edge of the distal end 62 on the outside in the radial direction. The first forming surface 64 includes a conical surface 64a and a plurality of depressed surfaces 64b. The conical surface 64a and the depressed surfaces 64b are connected to each other and continuous. Another part may be provided between the conical surface 64a and the depressed surface 64b.

The conical surface 64a is a curved surface in a conical shape having a diameter decreasing toward the distal end 62 (distal end 31a). The conical surface 64a extends between the edge of the proximal end 61 and the edge of the distal end 62 (distal end 31a) on the outside in the radial direction. The diameter of the edge of the proximal end 61 on the outside in the radial direction is larger than the diameter of the edge of the distal end 62 on the outside in the radial direction. The conical surface 64a may extend from the distal end 62 (distal end 31a) and be spaced apart from the proximal end 61.

The depressed surface 64b is, for example, a substantially flat surface facing the outside in the radial direction. The depressed surface 64b may be a curved surface protruding outward in the radial direction or a curved surface depressed inward in the radial direction. When the depressed surface 64b protrudes outward in the radial direction, the radius of curvature of the depressed surface 64b is larger than the diameter of the conical surface 64a. More specifically, the depressed surface 64b is depressed inward in the radial direction from the conical surface 64a. The depressed surface 64b is not limited to this example.

Figure 3:
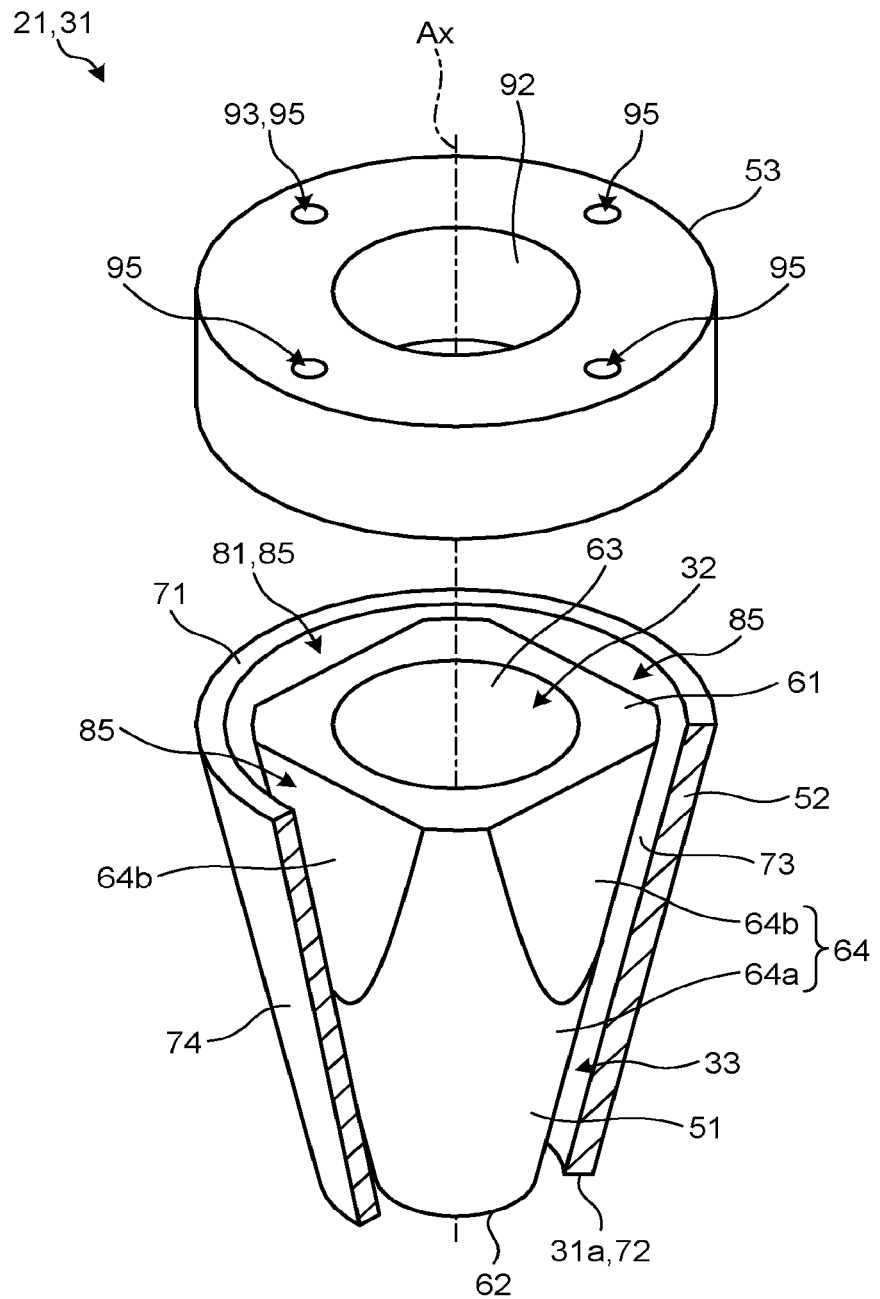
FIG. 3 is an exemplary exploded perspective view schematically illustrating a nozzle head in the first embodiment.

FIG. 3 is an exemplary exploded perspective view schematically illustrating the nozzle head 31 in the first embodiment. As illustrated in FIG. 3, a plurality of depressed surfaces 64b each extend from the edge of the proximal end 61 on the outside in the radial direction and are each spaced apart from the distal end 62 (distal end 31a) in the −A direction. The depressed surfaces 64b are spaced apart from each other and are arranged at substantially regular intervals in the circumferential direction. The depressed surfaces 64b are not limited to this example.

The second tubular wall 52 is formed in a substantially cylindrical shape extending along the center axis Ax. The second tubular wall 52 has a proximal end 71, a distal end 72, a second forming surface 73, and an outer surface 74. The second forming surface 73 of the second tubular wall 52 is an example of a second inner surface and a second curved surface.

The proximal end 71 is an end of the second tubular wall 52 in the −A direction. The proximal end 71 is, for example, a substantially flat and substantially annular surface facing the −A direction. The distal end 72 is an end of the second tubular wall 52 in the +A direction. The distal end 72 is, for example, a substantially flat and substantially annular surface facing the +A direction. The distal end 72 and the distal end 62 of the first tubular wall 51 form a part of the distal end 31a of the nozzle head 31. The distal end 72 may be different from the distal end 31a of the nozzle head 31.

The second forming surface 73 is the inner surface of the substantially cylindrical second tubular wall 52 and is a substantially conical curved surface facing the center axis Ax. The second forming surface 73 extends between an edge of the proximal end 71 and an edge of the distal end 72 on the inside in the radial direction. The second forming surface 73 is a curved surface in a conical shape having a diameter decreasing toward the distal end 72 (distal end 31a). More specifically, the diameter of the edge of the proximal end 71 on the inside in the radial direction is larger than the diameter of the edge of the distal end 72 on the inside in the radial direction. The second forming surface 73 may include a curved surface in a conical shape having a diameter decreasing toward the distal end 72 (distal end 31a), and another surface.

The outer surface 74 is a substantially conical curved surface positioned on the side opposite to the second forming surface 73. The outer surface 74 extends between an edge of the proximal end 71 and an edge of the distal end 72 on the outside in the radial direction. The outer surface 74 is a curved surface in a conical shape having a diameter decreasing toward the distal end 72 (distal end 31a). More specifically, the diameter of the edge of the proximal end 71 on the outside in the radial direction is larger than the diameter of the edge of the distal end 72 on the outside in the radial direction. The diameter of the outer surface 74 is not limited to this example and may be, for example, constant or may increase toward the distal end 72.

The second forming surface 73 faces the first forming surface 64 of the first tubular wall 51 with a gap interposed. More specifically, the second forming surface 73 faces the conical surface 64a with a gap interposed and also faces four depressed surfaces 64b with a gap interposed.

The ejection path 33 is formed between the second forming surface 73 and the conical surface 64a provided in the nozzle head 31. The ejection path 33 thus extends in the circumferential direction and has a substantially annular cross section orthogonal to the center axis Ax.

The distance (gap) between the conical surface 64a and the second forming surface 73 is substantially constant. For example, the distance between the conical surface 64a and the second forming surface 73 may decrease toward the distal end 31a.

A diffusion room 81 is formed between the second forming surface 73 and the depressed surfaces 64b provided in the nozzle head 31. The diffusion room 81 includes a plurality of diffusion spaces 85. The diffusion space 85 is an example of the space.

In the present embodiment, the second forming surface 73 and the four depressed surfaces 64b form four diffusion spaces 85. The number of diffusion spaces 85 is not limited to this example and may be three, six, eight, or any other number. Only one diffusion space 85 (diffusion room 81) may be provided in the nozzle head 31. The four diffusion spaces 85 are spaced apart from each other and disposed at substantially regular intervals in the circumferential direction.

The diffusion space 85 (diffusion room 81) formed with the depressed surface 64b and the second forming surface 73 is spaced apart from the distal end 31a of the nozzle head 31 in the −A direction. Since the conical surface 64a and the depressed surface 64b are continuous, the diffusion space 85 and the ejection path 33 communicate with each other. The ejection path 33 is thus interposed between the diffusion space 85 and the distal end 31a.

The ejection path 33 is positioned between a plurality of diffusion spaces 85 in the circumferential direction. To put it another way, adjacent two diffusion spaces 85 are connected to each other through the ejection path 33. A wall or a protrusion may be interposed between two diffusion spaces 85.

Figure 4:
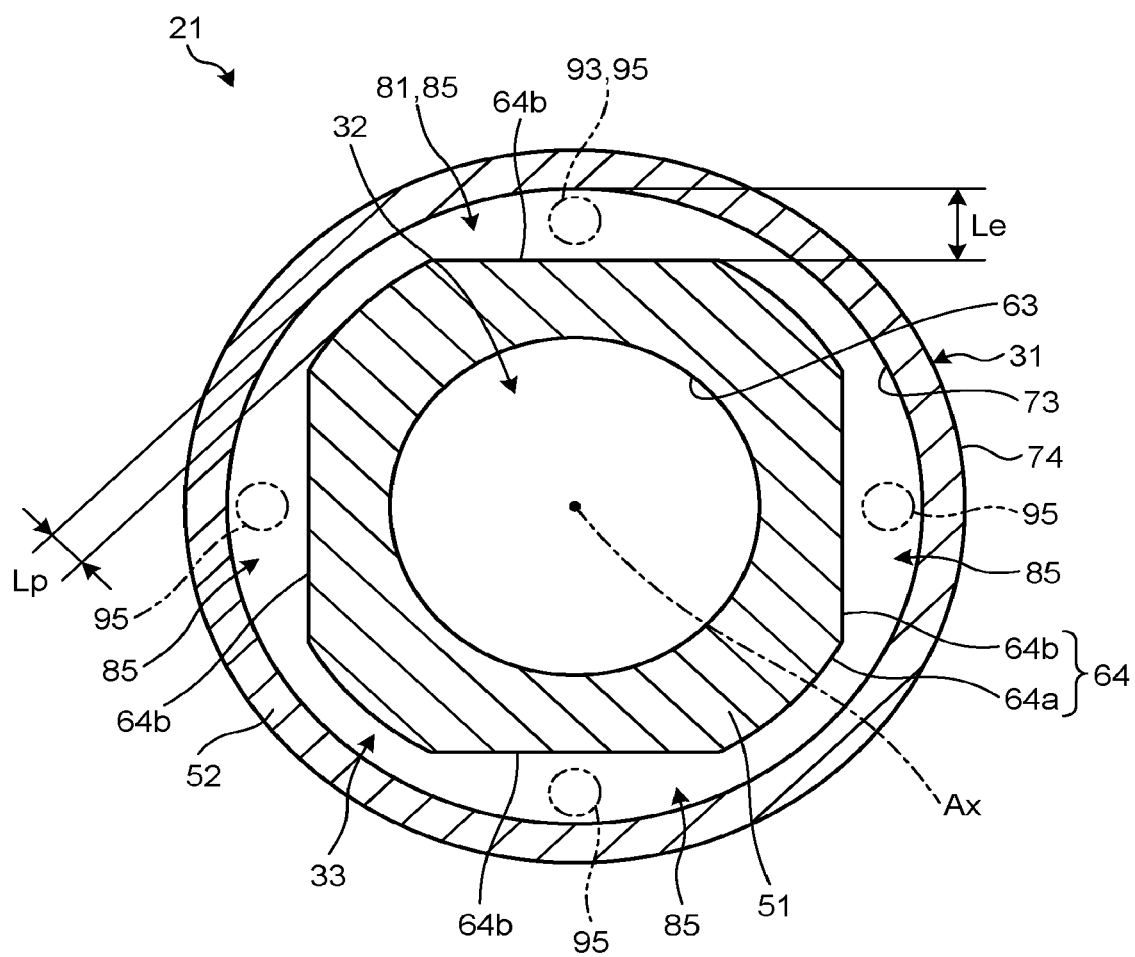
FIG. 4 is an exemplary cross-sectional view of the nozzle head in the first embodiment taken along line F4-F4 in FIG. 2.

FIG. 4 is an exemplary cross-sectional view of the nozzle head 31 in the first embodiment taken along line F4-F4 in FIG. 2. As illustrated in FIG. 4, a distance Le between the first forming surface 64 (depressed surface 64b) and the second forming surface 73 in the diffusion space 85 is longer than a distance Lp between the first forming surface 64 (conical surface 64a) and the second forming surface 73 in the ejection path 33.

The distance Le, Lp is, for example, the distance in the radial direction. The distance Le may be the distance between a point on the depressed surface 64b and a point closest to the point on the second forming surface 73. The distance Lp may be the distance between a point on the conical surface 64a and a point closest to the point on the second forming surface 73.

In the present embodiment, the distance Le and the distance Lp are substantially equal at a portion where the diffusion space 85 and the ejection path 33 are connected. However, at least the maximum distance Le between the depressed surface 64b and the second forming surface 73 in the diffusion space 85 is longer than the maximum distance Lp between the conical surface 64a and the second forming surface 73 in the ejection path 33. Furthermore, the distance Le between the depressed surface 64b of the diffusion space 85 and the second forming surface 73 at a position spaced apart from the portion where the diffusion space 85 and the ejection path 33 are connected is longer than the distance Lp between the conical surface 64a and the second forming surface 73 in the ejection path 33. In the present embodiment, the distance Lp is substantially constant.

As illustrated in FIG. 2, in the diffusion space 85 (diffusion room 81), the distance Le between the depressed surface 64b and the second forming surface 73 at substantially the same position in the circumferential direction decreases toward the distal end 31a of the nozzle head 31. To put it another way, the cross-sectional area of the diffusion space 85 orthogonal to the center axis Ax decreases toward the distal end 31a of the nozzle head 31. The diffusion space 85 (diffusion room 81) is not limited to this example.

The proximal portion 53 is connected to the first tubular wall 51 and the second tubular wall 52. The proximal portion 53 is formed in a substantially cylindrical shape extending along the center axis Ax. The proximal portion 53 may be formed in any other shape. The proximal portion 53 has a connection surface 91 and an inner surface 92.

The connection surface 91 is an annular and substantially flat surface facing the +A direction. The connection surface 91 may have any other shape. The connection surface 91 is connected to the proximal end 61 of the first tubular wall 51 and the proximal end 71 of the second tubular wall 52. The connection surface 91 thus forms a bottom surface on the ejection path 33 and the diffusion space 85 of the diffusion room 81.

The inner surface 92 is a substantially cylindrical curved surface facing the center axis Ax. The inner surface 92 extends in the −A direction from an edge of the connection surface 91 on the inside in the radial direction. The inner surface 92 is continuous to the inner surface 63 of the first tubular wall 51 in the −A direction. The inner surface 92 forms a part of the emission path 32.

To put it another way, a part of the emission path 32 is formed inside the inner surface 92.

The proximal portion 53 is provided with a supply path 93. The supply path 93 includes a plurality of supply holes 95. In the present embodiment, the proximal portion 53 has four supply holes 95. In other words, the number of supply holes 95 is equal to the number of diffusion spaces 85. The number of supply holes 95 may be different from the number of diffusion spaces 85.

The supply holes 95 are open to the connection surface 91. The four supply holes 95 are disposed at regular intervals in the circumferential direction and each communicate with one of the four diffusion spaces 85. The supply holes 95 communicate with the substantial center of the diffusion space 85 in the circumferential direction. The supply hole 95 is not limited to this example and may communicate with an end of the diffusion space 85 in the circumferential direction. In the present embodiment, the supply hole 95 extends parallel to the center axis Ax. The supply hole 95 may extend in any other direction.

The supply hole 95 (supply path 93) connects the diffusion space 85 (diffusion room 81) and the material supply device 42 through the supply tube 21a in FIG. 1.

The material supply device 42 supplies the material M and the carrier gas G to the supply hole 95 through the supply tube 21a. The supply hole 95 thus supplies the material M and the carrier gas G to the diffusion space 85.

The lengths of respective channels between the four diffusion spaces 85 and the material supply device 42 are substantially equal to each other. The material M and the carrier gas G are thus supplied substantially evenly from the four supply holes 95 to four diffusion rooms 81.

Figure 5:
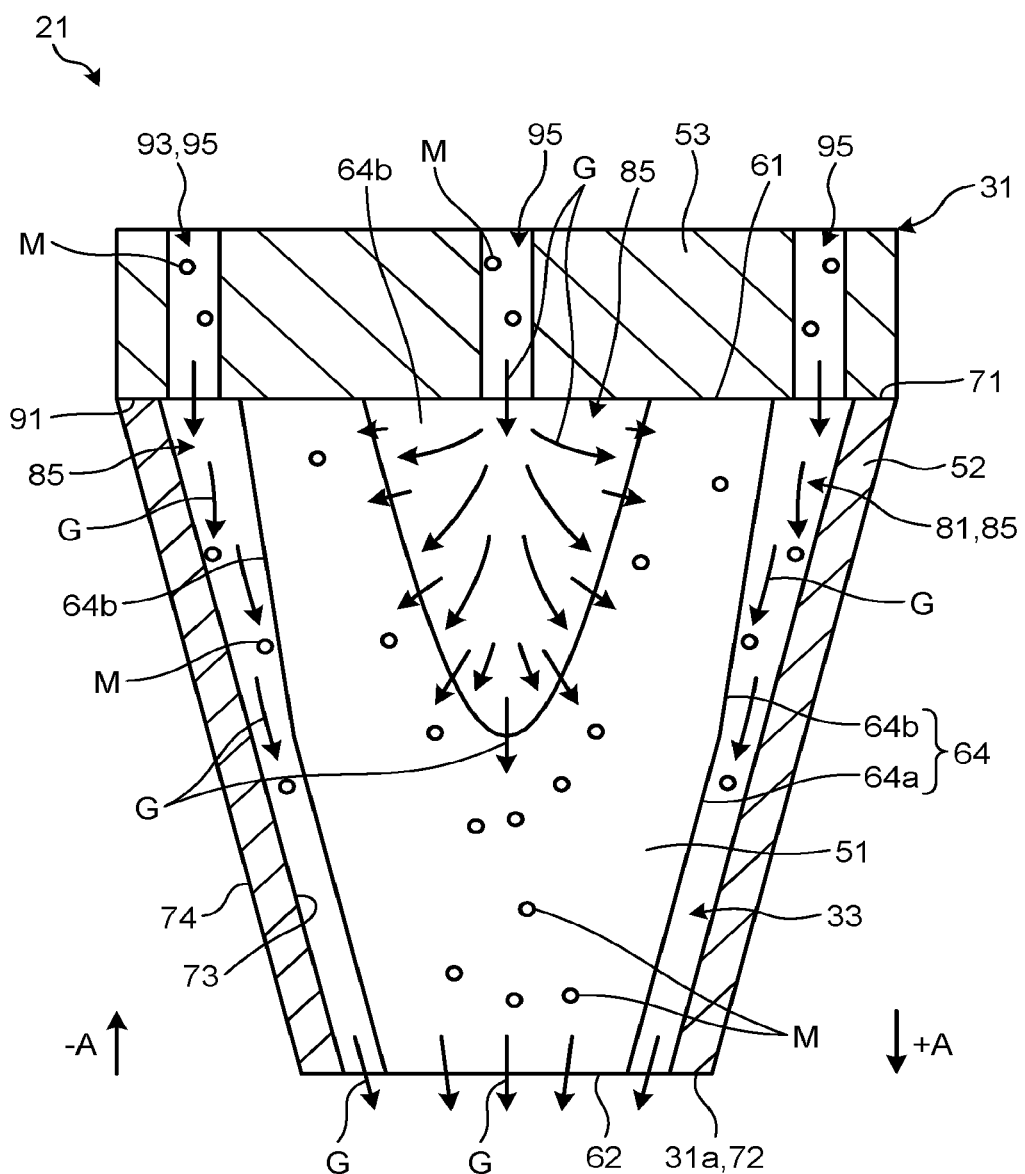
FIG. 5 is an exemplary cross-sectional view schematically illustrating the nozzle head in the first embodiment and an ejected material.

FIG. 5 is an exemplary cross-sectional view schematically illustrating the nozzle head 31 in the first embodiment and the ejected material M. In FIG. 5, the cross section of the proximal portion 53 is illustrated such that three supply holes 95 are illustrated. In FIG. 5, the first tubular wall 51 is illustrated as a side view rather than a sectional view.

The cross section of the diffusion space 85 orthogonal to the center axis Ax is larger than the cross section of the supply hole 95. The material M and the carrier gas G supplied from the supply hole 95 to the diffusion space 85 thus diffuse in the diffusion space 85.

As described above, the drag acting on a fluid in the ejection path 33 is greater than the drag acting on the fluid in the diffusion space 85. The material M and the carrier gas G therefore diffuse in the diffusion space 85 before moving to the ejection path 33.

The material M and the carrier gas G flow into the ejection path 33 in a state in which they are roughly evenly distributed in the diffusion space 85. In other words, the diffuspace 85 (diffusion room 81) supplies the material M and the carrier gas G to the ejection path 33.

The cross section of the diffusion space 85 orthogonal to the center axis Ax decreases toward the distal end 31*a* of the nozzle head 31. The distance Le between the depressed surface 64*b* and the second forming surface 73 changes more gently as it is closer to the distal end 31*a* of the nozzle head 31. The difference in drag between the diffusion space 85 and the ejection path 33 thus decreases toward the distal end 31*a*. Accordingly, the ratio of the material M and the carrier gas G moving toward the distal end 31*a* to those supplied from the diffusion space 85 to the ejection path 33 increases.

The material M and the carrier gas G supplied to the ejection path 33 are ejected from the distal end 31*a* of nozzle head 31, for example, toward the bead 3*a* of the object 3. When the nozzle 21 is oriented in the oblique direction or the horizontal direction, the gravity attempts to move the material M in the downward direction. The material M and the carrier gas G, however, are supplied from the diffusion spaces 85 disposed at substantially regular intervals in the circumferential direction to the ejection path 33. Accordingly, even when the nozzle 21 is oriented in the oblique direction or the horizontal direction, the material M and the carrier gas G are roughly evenly distributed in the circumferential direction.

The nozzle 21 melts or sinters the material M ejected from the distal end 31*a* of the nozzle head 31 by the energy beam E. The distribution of the material M in the circumferential direction is roughly even. This configuration can suppress change in density of the material M in the object 3 due to change in orientation of the nozzle 21.

The material M and the carrier gas G are supplied to the ejection path 33 after being diffused in the diffusion space 85 (diffusion room 81). This configuration can suppress clogging with the material M due to uneven distribution of the material M. The ejection path 33 is not a circular or rectangular hole but is formed in a slit shape between the conical surface 64*a* and the second forming surface 73 in a conical shape. In other words, the connection portion between the diffusion space 85 and the ejection path 33 extends linearly as an entrance from the diffusion space 85 to the ejection path 33. This configuration can suppress clogging with the material M due to concentration of the material M.

As described above, the nozzle 21 can suppress change in distribution of the material M due to change in orientation of the nozzle 21 and suppress clogging of the nozzle 21 with the material M. The additive manufacturing system 1 can increase the amount of material M ejected per unit time by using the nozzle 21, and consequently, reduce the time required for modeling the object 3.

In the additive manufacturing system 1 according to the first embodiment described above, the first forming surface 64 provided in the nozzle 21 includes the conical surface 64*a* in a conical shape. The second forming surface 73 provided in the nozzle 21 faces the first forming surface 64 with a gap interposed and includes a curved surface in a conical shape. The ejection path 33 that ejects the material M and the carrier gas G from the distal end 31*a* is formed between the conical surface 64*a* and the second forming surface 73. The diffusion room 81 that supplies the material M and the carrier gas G to the ejection path 33 is formed between the first forming surface 64 and the second forming surface 73. The distance Le between the first forming surface 64 and the second forming surface 73 in the diffusion room 81 is longer than the distance Lp between the conical surface 64*a* and the second forming surface 73 in the ejection path 33. The drag in the diffusion room 81 is therefore lower than the drag in the ejection path 33. The material M and the carrier gas G supplied to the diffusion room 81 are supplied to the ejection path 33 after being diffused in the diffusion room 81 because of the difference of drag. Furthermore, the ejection path 33 is provided between the conical surface 64*a* and the second forming surface 73 in a conical shape and therefore formed in a slit shape extending in the circumferential direction around the center axis Ax of the nozzle 21. Accordingly, uneven distribution of the material M and the carrier gas G supplied from the diffusion room 81 to the ejection path 33 is suppressed, and consequently, change in distribution (supply density) of the ejected material M and carrier gas G due to change in orientation of the nozzle 21 is suppressed. Furthermore, the clogging of the nozzle head 31 with the material M is suppressed. Since the clogging with the material M is suppressed, the amount of material M that the nozzle 21 can stably eject over a long time is increased, and the modeling speed of additive manufacturing by the nozzle 21 is increased. Furthermore, since the cross-sectional area of the ejection path 33 is smaller than the cross-sectional area of the diffusion room 81, the speed of the ejected material M and carrier gas G is higher than the speed of the material M and carrier gas G in the diffusion room 81. Accordingly, change in distribution of the ejected material M and carrier gas G due to change in orientation of the nozzle 21 is suppressed, and the ejected material M is easily converged.

The diffusion room 81 includes a plurality of diffusion spaces 85 spaced apart from each other and disposed at regular intervals in the circumferential direction around the center axis Ax. The supply path 93 includes a plurality of supply holes 95 each communicating with one of the diffusion spaces 85. With this configuration, the material M and the carrier gas G are diffused in each diffusion space 85. Accordingly, uneven distribution of the material M and the carrier gas G in the diffusion room 81 due to the orientation of the nozzle 21 is suppressed, and consequently, change in distribution of the ejected material M and carrier gas G due to change in orientation of the nozzle 21 is suppressed.

The supply holes 95 are disposed at regular intervals in the circumferential direction. With this configuration, uneven distribution of the material M and the carrier gas G in the diffusion spaces 85 is suppressed, and consequently, change in distribution of the ejected material M and carrier gas G due to change in orientation of the nozzle 21 is suppressed.

A part of the ejection path 33 is positioned between the diffusion spaces 85. In this configuration, the connection portion between the diffusion room 81 and the ejection path 33 that allows the material M and the carrier gas G to pass through is large. Accordingly, clogging of the nozzle head 31 with the material M is suppressed.

In the diffusion room 81, the distance Le between the first forming surface 64 and the second forming surface 73 decreases toward the distal end 31*a*. The cross-sectional area of the diffusion room 81 therefore decreases toward the distal end 31*a*, and the difference in drag between the diffusion room 81 and the ejection path 33 decreases toward the distal end 31*a*. Accordingly, the ratio of the material M and the carrier gas G moving toward the distal end 31*a* to those supplied from the diffusion room 81 to the ejection path 33 increases, thereby suppressing decrease in speed of the material M and carrier gas G ejected from the distal end 31a. Since the speed of the ejected material M and carrier gas G increases, the ejected material M is more easily converged.

Second Embodiment

A second embodiment will be described below with reference to FIG. 6 to FIG. 9. In the following description of embodiments, a constituent element having a function equivalent to the constituent element already described is denoted by the same reference sign as the previously described constituent element and the description may be omitted. A plurality of constituent elements denoted by the same reference sign do not have in common in all the functions and characteristics and may have different functions and characteristics depending on the embodiments.

Figure 6:
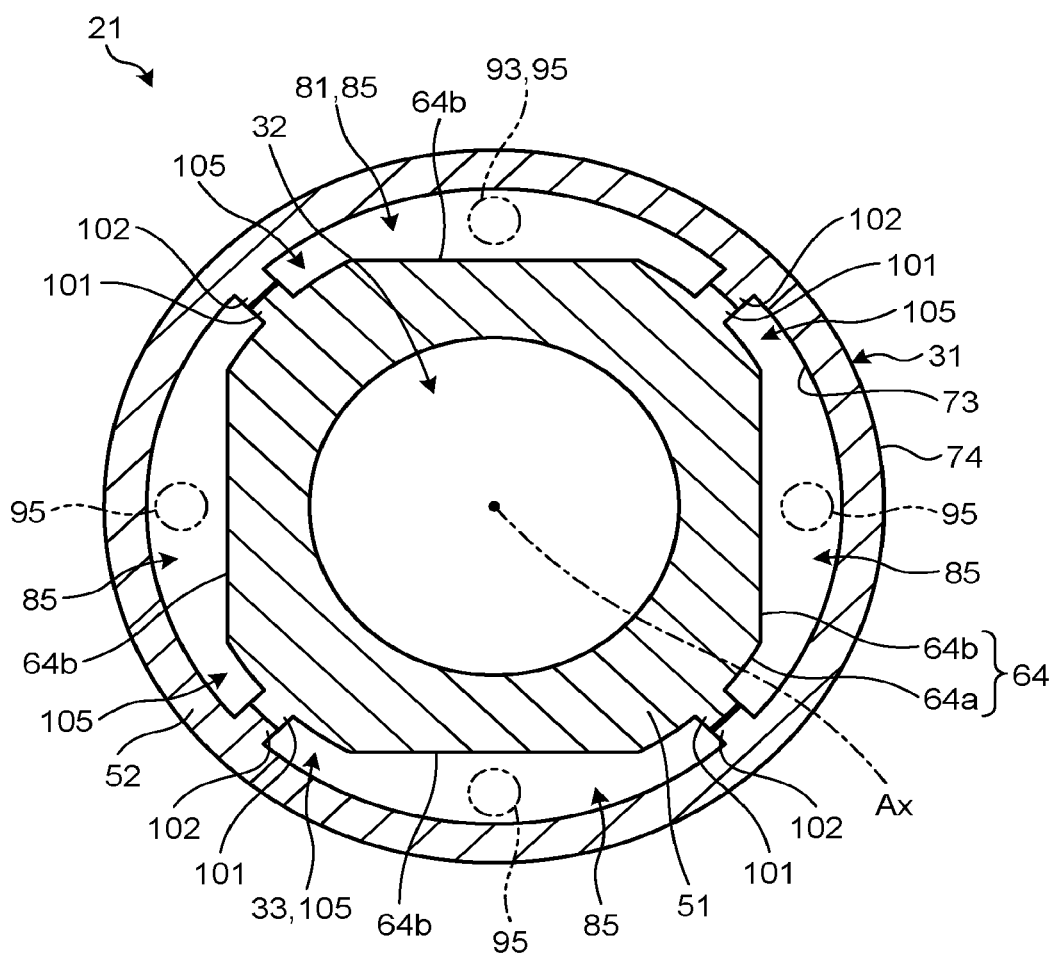
FIG. 6 is an exemplary cross-sectional view of the nozzle head according to a second embodiment.
Figure 7:
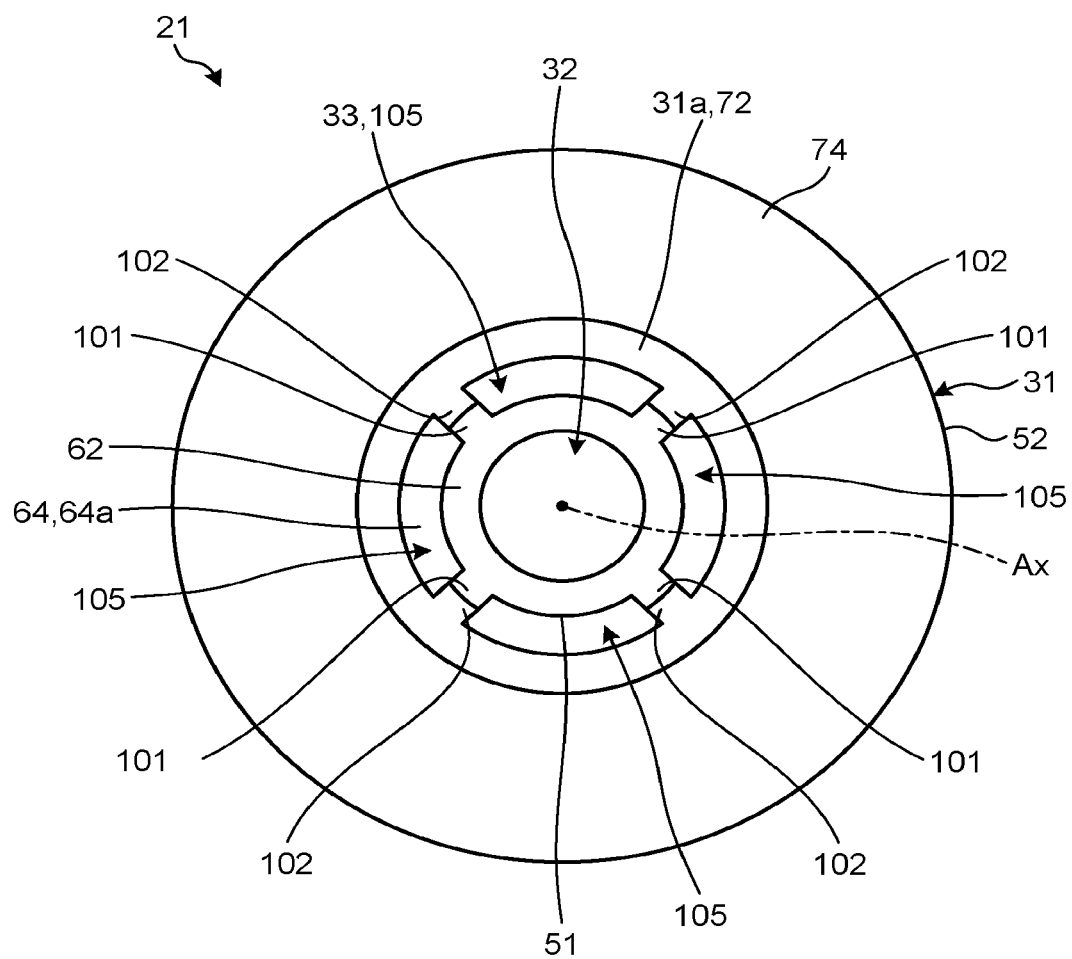
FIG. 7 is an exemplary bottom view of a distal end of the nozzle head in the second embodiment.

FIG. 6 is an exemplary cross-sectional view of the nozzle head 31 according to the second embodiment. FIG. 7 is an exemplary bottom view of the distal end 31a of the nozzle head 31 in the second embodiment. As illustrated in FIG. 6 and FIG. 7, the first tubular wall 51 in the second embodiment has a plurality of first protrusions 101. The first protrusion 101 is an example of the first partition. The first protrusion 101 protrudes from the conical surface 64a in the radial direction. In other words, the first protrusion 101 is connected to the conical surface 64a.

The first protrusion 101 extends between an end of the conical surface 64a in the +A direction and an end of the conical surface 64a in the −A direction. In the present embodiment, the width of the first protrusion 101 in the circumferential direction is substantially constant. In the present embodiment, the first protrusion 101 extends linearly. However, the first protrusion 101 is not limited to this example and may extend, for example, spirally.

In the present embodiment, the first tubular wall 51 has four first protrusions 101 disposed at substantially regular intervals in the circumferential direction. In other words, the number of first protrusions 101 is equal to the number of diffusion spaces 85. The number of first protrusions 101 may be different from the number of diffusion spaces 85.

The first protrusion 101 is positioned between adjacent two depressed surfaces 64b in the circumferential direction. The first protrusion 101 is thus positioned between adjacent two diffusion spaces 85 in the circumferential direction.

The second tubular wall 52 in the second embodiment has a plurality of second protrusions 102. The second protrusion 102 is an example of the first partition. The second protrusion 102 protrudes from the second forming surface 73 in the radial direction. In other words, the second protrusion 102 is connected to the second forming surface 73.

The second protrusion 102 extends between an end of the second forming surface 73 in the +A direction and an end of the second forming surface 73 in the −A direction. In the present embodiment, the width of the second protrusion 102 in the circumferential direction is substantially constant. In the present embodiment, the second protrusion 102 extends linearly. However, the second protrusion 102 is not limited to this example and may extend, for example, spirally.

In the present embodiment, the second tubular wall 52 has four second protrusions 102 disposed at substantially regular intervals in the circumferential direction. In other words, the number of second protrusions 102 is equal to the number of diffusion spaces 85. The number of second protrusions 102 may be different from the number of diffusion spaces 85.

The second protrusion 102 is positioned between adjacent two diffusion spaces 85 in the circumferential direction. The four first protrusions 101 and the four second protrusions 102 are disposed substantially at the same positions in the circumferential direction.

The first protrusion 101 and the second protrusion 102 are in contact with each other. The first protrusions 101 and the second protrusions 102 partition the ejection path 33 into four division ejection paths 105. The first protrusion 101 and the second protrusion 102 may be spaced apart from each other.

Each division ejection path 105 communicates with the corresponding diffusion space 85. The diffusion space 85 thus supplies the material M and the carrier gas G to the corresponding division ejection path 105. Each division ejection path 105 ejects the material M and the carrier gas G from the distal end 31a of the nozzle head 31.

Figure 8:
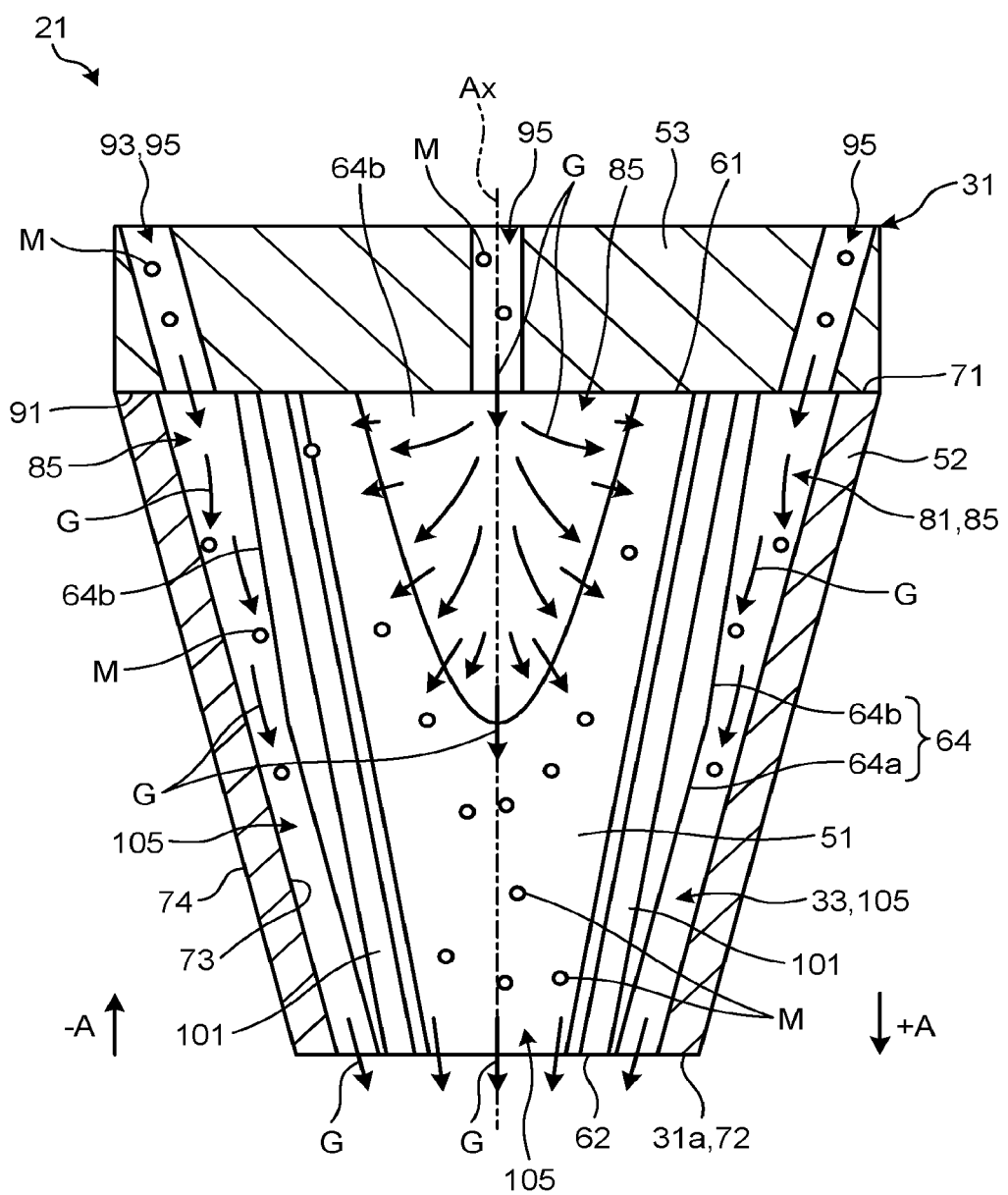
FIG. 8 is an exemplary cross-sectional view schematically illustrating the nozzle head in the second embodiment and the ejected material.

FIG. 8 is an exemplary cross-sectional view schematically illustrating the nozzle head 31 in the second embodiment and the ejected material M. As illustrated in FIG. 8, in the second embodiment, the supply hole 95 (supply path 93) supplies the material M and the carrier gas G to the diffusion space 85 (diffusion room 81) in a direction substantially parallel to the ejection path 33. The supply hole 95 thus supplies the material M and the carrier gas G in a direction toward the distal end 31a of the nozzle head 31.

To put it another way, the supply hole 95 supplies the material M and the carrier gas G to the diffusion space 85 in a direction in which the ejection path 33 extends. To put it yet another way, the supply hole 95 supplies the material M and the carrier gas G to the diffusion space 85 such that the material M and the carrier gas G come closer to the center axis Ax as they are closer to the distal end 31a.

In the additive manufacturing system 1 in the second embodiment described above, the first protrusions 101 and the second protrusions 102 are positioned between the diffusion spaces 85 and connected to the conical surface 64a and the second forming surface 73. With this configuration, the material M and the carrier gas G supplied from one diffusion space 85 to the ejection path 33 are less likely to move unevenly in the circumferential direction. Accordingly, uneven distribution of the material M and the carrier gas G in the diffusion room 81 due to the orientation of the nozzle 21 is suppressed, and consequently, change in distribution of the ejected material M and carrier gas G due to change in orientation of the nozzle 21 is suppressed.

The supply path 93 supplies the material M and the carrier gas G to the diffusion room 81 in a direction parallel to the ejection path 33. With this configuration, the ratio of the material M and the carrier gas G moving toward the distal end 31a to those supplied from the diffusion room 81 to the ejection path 33 increases, thereby suppressing decrease in speed of the material M and carrier gas G ejected from the distal end 31a. Since the speed of the ejected material M and carrier gas G increases, the ejected material M is more easily converged.

Figure 9:
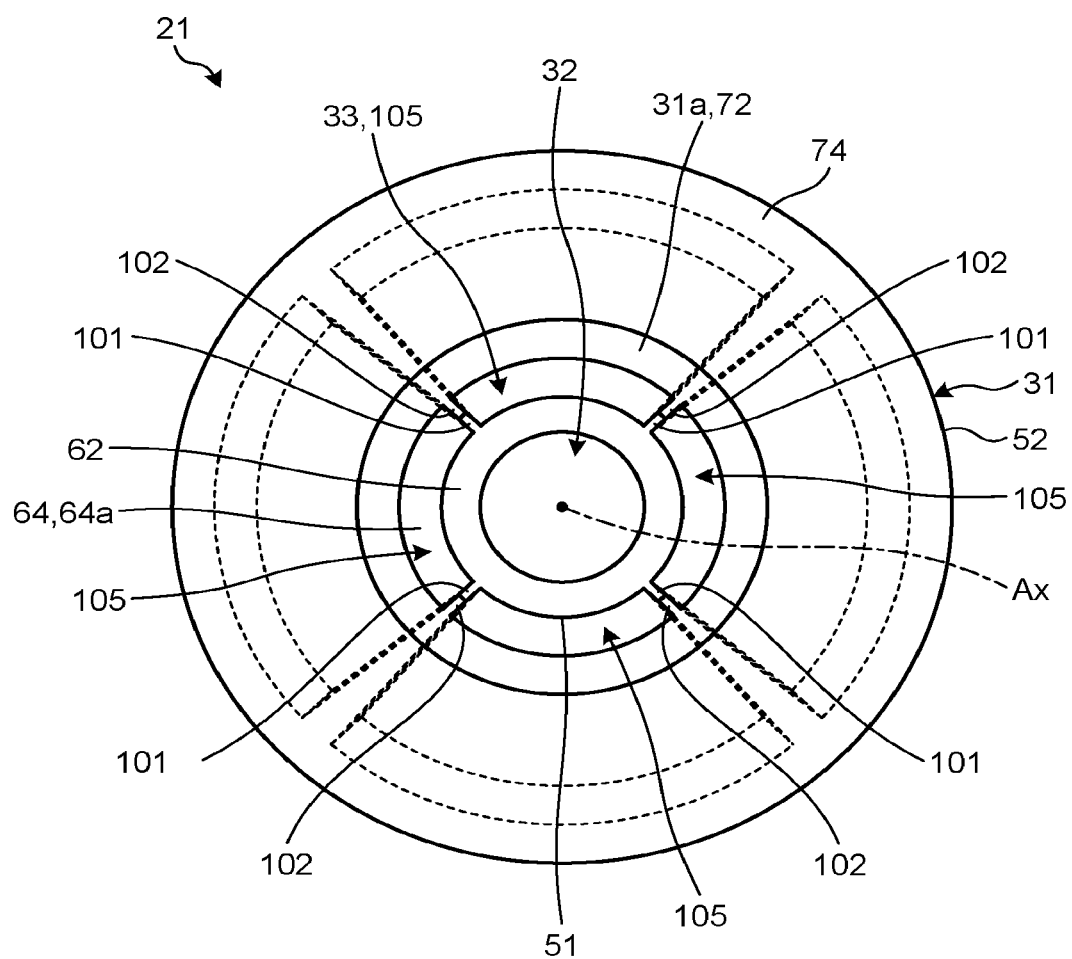
FIG. 9 is an exemplary bottom view of the distal end of the nozzle head according to a modification of the second embodiment.

FIG. 9 is an exemplary bottom view of the distal end 31a of the nozzle head 31 according to a modification of the second embodiment. As illustrated in FIG. 9, in a first modification of the second embodiment, the width of the first protrusion 101 and the second protrusion 102 in the circumferential direction decreases toward the distal end 31a of the nozzle head 31. In this way, the width of the first protrusion 101 and the second protrusion 102 is not necessarily constant.

In the second embodiment, the nozzle head 31 has both of the first protrusion 101 and the second protrusion 102. However, the nozzle head 31 may have one of the first protrusion 101 and the second protrusion 102.

When the nozzle head 31 has the first protrusion 101, the first protrusion 101 is in contact with the second forming surface 73. The first protrusions 101 partition the ejection path 33 into the four division ejection paths 105. The first protrusion 101 may be spaced apart from the second forming surface 73. In this case, the distance between the first protrusion 101 and the second forming surface 73 is shorter than the distance Lp between the conical surface 64a and the second forming surface 73.

When the nozzle head 31 has the second protrusion 102, the second protrusion 102 is in contact with the conical surface 64a. The second protrusions 102 partition the ejection path 33 into the four division ejection paths 105. The second protrusion 102 may be spaced apart from the conical surface 64a. In this case, the distance between the second protrusion 102 and the conical surface 64a is shorter than the distance Lp between the conical surface 64a and the second forming surface 73.

Third Embodiment

Figure 10:
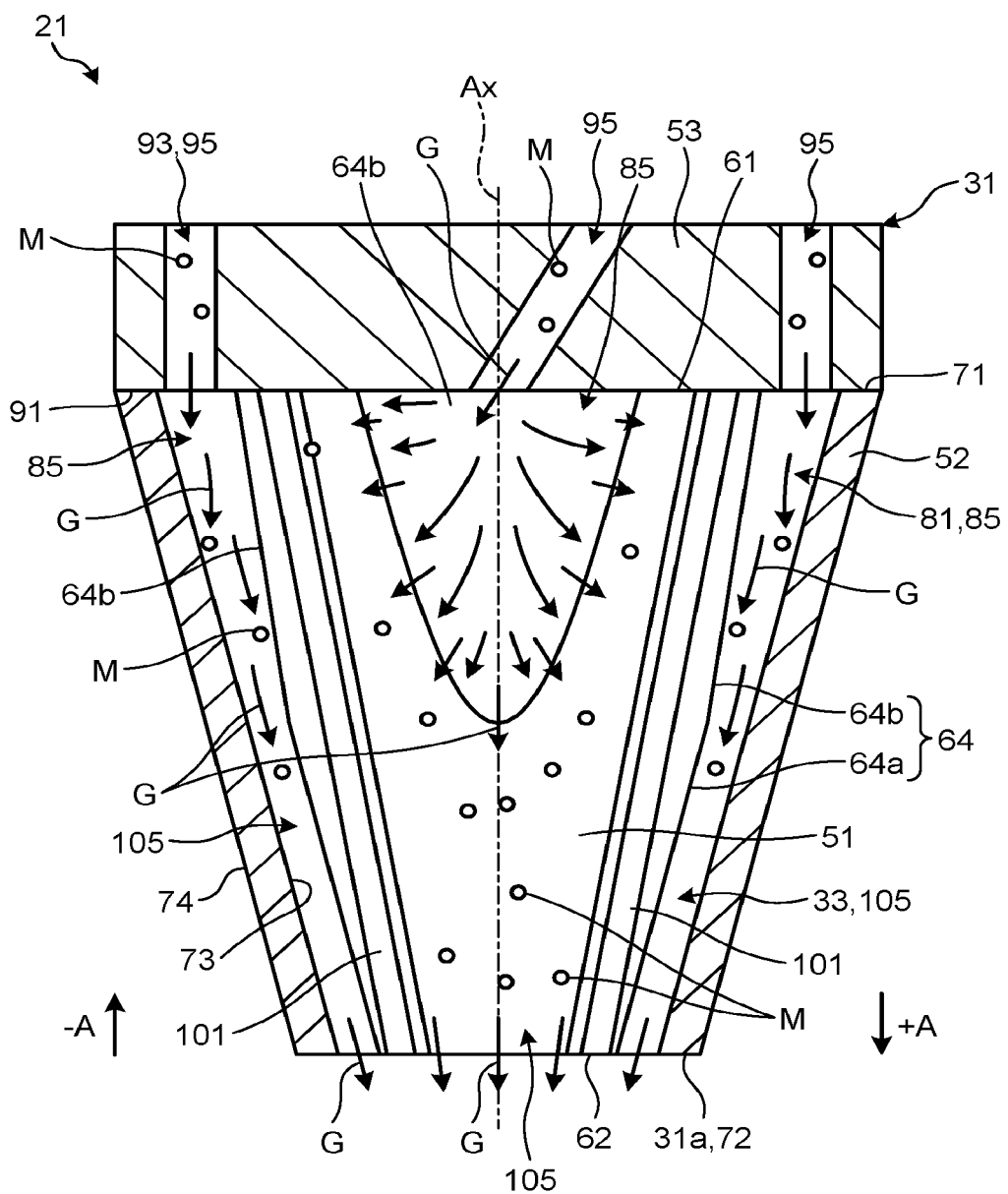
FIG. 10 is an exemplary cross-sectional view schematically illustrating the nozzle head according to a third embodiment and the ejected material.

A third embodiment will be described below with reference to FIG. 10. FIG. 10 is an exemplary cross-sectional view schematically illustrating the nozzle head 31 according to the third embodiment and the ejected material M. As illustrated in FIG. 10, the nozzle head 31 in the third embodiment is the same as the nozzle head 31 in the second embodiment except for the orientation of the supply hole 95.

In the third embodiment, the supply hole 95 (supply path 93) is skew to the center axis Ax of the nozzle head 31. The supply hole 95 therefore supplies the material M and the carrier gas G in a direction that is neither parallel to the center axis Ax nor intersects the center axis Ax.

The supply hole 95 supplies the material M and the carrier gas G in a direction different from the direction toward the distal end 31a of the nozzle head 31. With this configuration, the material M and the carrier gas G supplied from the supply hole 95 are less likely to be concentrated on the end portion of the diffusion space 85 in the +A direction. The material M and the carrier gas G can be distributed more evenly in the diffusion space 85.

In the additive manufacturing system 1 in the third embodiment described above, the supply path 93 is skew to the center axis Ax of the nozzle head 31 extending in the +A direction. This configuration reduces the velocity component toward the distal end 31a among the speed of the material M and the carrier gas G supplied to the diffusion room 81. Accordingly, the material M and the carrier gas G supplied to the diffusion room 81 are distributed more evenly in the diffusion room 81, and consequently, change in distribution of the ejected material M and carrier gas G due to change in orientation of the nozzle 21 is suppressed.

Fourth Embodiment

Figure 11:
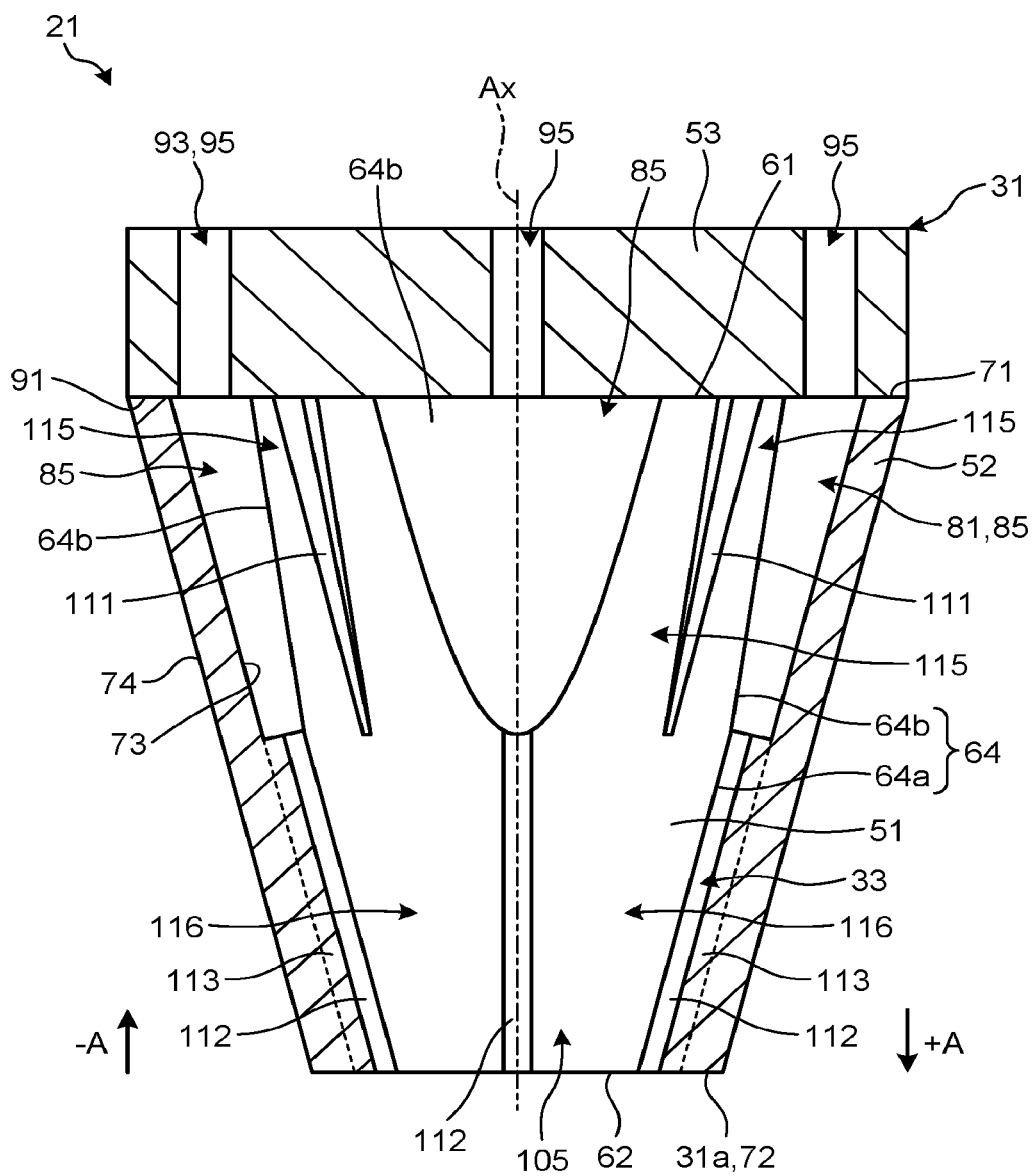
FIG. 11 is an exemplary cross-sectional view schematically illustrating the nozzle head according to a fourth embodiment.

A fourth embodiment will be described below with reference to FIG. 11 and FIG. 12. FIG. 11 is an exemplary cross-sectional view schematically illustrating the nozzle head 31 according to the fourth embodiment. As illustrated in FIG. 11, the first tubular wall 51 in the fourth embodiment has first partitions 111 and second partitions 112.

The first partition 111 protrudes from the conical surface 64a in the radial direction. In other words, the first partition 111 is connected to the conical surface 64a. The first partition 111 extends from an end of the conical surface 64a in the −A direction. Furthermore, the first partition 111 is spaced apart from the distal end 31a of the nozzle head 31 in the −A direction.

In the present embodiment, the width of the first partition 111 in the circumferential direction and the length of the first partition 111 in the radial direction decrease toward the distal end 31a. In the present embodiment, the first partition 111 extends linearly. However, the first partition 111 is not limited to this example and may extend, for example, spirally.

In the present embodiment, the first tubular wall 51 has four first partitions 111 disposed at substantially regular intervals in the circumferential direction. In other words, the number of first partitions 111 is equal to the number of diffusion spaces 85. The number of first partitions 111 may be different from the number of diffusion spaces 85.

The first partition 111 is positioned between adjacent two depressed surfaces 64b in the circumferential direction. The first partition 111 is thus positioned between adjacent two diffusion spaces 85 in the circumferential direction. The four first partitions 111 partition the ejection path 33 into four division ejection paths 115.

Figure 12:
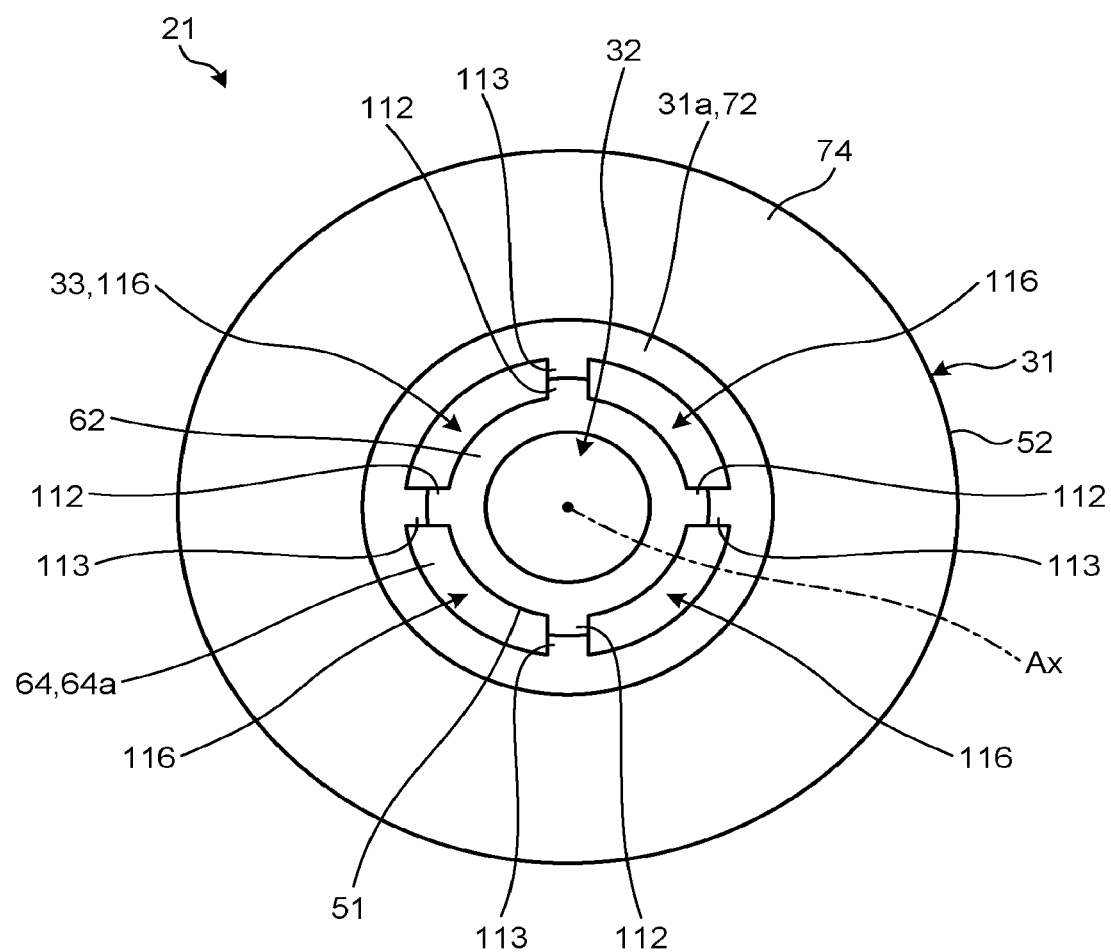
FIG. 12 is an exemplary bottom view of the distal end of the nozzle head in the fourth embodiment.

FIG. 12 is an exemplary bottom view of the distal end 31a of the nozzle head 31 in the fourth embodiment. As illustrated in FIG. 12, the second partition 112 protrudes from the conical surface 64a in the radial direction. In other words, the second partition 112 is connected to the conical surface 64a.

As illustrated in FIG. 11, the second partition 112 extends from the end of the conical surface 64a in the +A direction. Furthermore, the second partition 112 is spaced apart from the end of the conical surface 64a in the −A direction, in the +A direction. In the present embodiment, the width of the second partition 112 in the circumferential direction is substantially constant. In the present embodiment, the second partition 112 extends linearly. However, the second partition 112 is not limited to this example and may extend, for example, spirally.

In the present embodiment, the first tubular wall 51 has four second partitions 112 disposed at substantially regular intervals with a gap in the circumferential direction. In other words, the number of second partitions 112 is equal to the number of diffusion spaces 85. The number of second partitions 112 may be different from the number of diffusion spaces 85.

The second partition 112 is positioned between adjacent two first partitions 111 in the circumferential direction. For example, the second partition 112 is adjacent to the depressed surface 64b in the +A direction. The position of the second partition 112 is not limited to this example.

The second tubular wall 52 in the fourth embodiment has a plurality of third partitions 113. The third partition 113 is an example of the second partition. The third partition 113 protrudes from the second forming surface 73 in the radial direction. In other words, the third partition 113 is connected to the second forming surface 73. The third partition 113 extends from an end of the second forming surface 73 in the +A direction. Furthermore, the third partition 113 is spaced apart from an end of the second forming surface 73 in the −A direction, in the +A direction. In the present embodiment, the width of the third partition 113 in the circumferential direction is substantially constant. In the present embodiment, the third partition 113 extends linearly. However, the third partition 113 is not limited to this example and may extend, for example, spirally.

In the present embodiment, the second tubular wall 52 has four third partitions 113 disposed at substantially regular intervals with a gap in the circumferential direction. In other words, the number of third partitions 113 is equal to the number of diffusion spaces 85. The number of third partitions 113 may be different from the number of diffusion spaces 85.

The third partition 113 is positioned between adjacent two first partitions 111 in the circumferential direction. For example, the second partition 112 is adjacent to the diffusion space 85 in the +A direction. The four second partitions 112 and the four third partitions 113 are disposed substantially at the same positions in the circumferential direction. The position of the third partition 113 is not limited to this example.

The second partition 112 and the third partition 113 are in contact with each other. The second partitions 112 and the third partitions 113 partition the ejection path 33 into four division ejection paths 116. The second partition 112 and the third partition 113 may be spaced apart from each other.

The division ejection paths 115 formed by the first partitions 111 may overlap with the division ejection paths 116 formed by the second partitions 112 and the third partitions 113. In other words, a part of the ejection path 33 may be partitioned by the first partitions 111, the second partitions 112, and the third partitions 113 into eight division ejection paths.

In the additive manufacturing system 1 in the fourth embodiment described above, the second partitions 112 and the third partitions 113 are connected to the conical surface 64a and the second forming surface 73, extend from the distal end 31a, and are disposed with a gap in the circumferential direction around the center axis Ax. Accordingly, uneven distribution of the material M and the carrier gas G in the ejection path 33 due to the orientation of the nozzle 21 is suppressed, and consequently, change in distribution of the ejected material M and carrier gas G due to change in orientation of the nozzle 21 is suppressed.

In the fourth embodiment, the nozzle head 31 has both of the second partition 112 and the third partition 113. However, the nozzle head 31 may have one of the second partition 112 and the third partition 113.

When the nozzle head 31 has the second partition 112, the second partition 112 is in contact with the second forming surface 73. The second partitions 112 partition the ejection path 33 into the four division ejection paths 116. The second partition 112 may be spaced apart from the second forming surface 73. In this case, the distance between the second partition 112 and the second forming surface 73 is shorter than the distance Lp between the conical surface 64a and the second forming surface 73.

When the nozzle head 31 has the third partition 113, the third partition 113 is in contact with the conical surface 64a. The third partitions 113 partition the ejection path 33 into the four division ejection paths 116. The third partition 113 may be spaced apart from the conical surface 64a. In this case, the distance between the third partition 113 and the conical surface 64a is shorter than the distance Lp between the conical surface 64a and the second forming surface 73.

According to at least one embodiment described above, a first inner surface provided in the nozzle includes a first curved surface in a conical shape. A second inner surface provided in the nozzle faces the first inner surface with a gap interposed and includes a second curved surface in a conical shape. A second passage that ejects powder and fluid from an end portion is formed between the first curved surface and the second curved surface. A diffusion room that supplies powder and fluid to the second passage is formed between the first inner surface and the second inner surface. The distance between the first inner surface and the second inner surface in the diffusion room is longer than the distance between the first curved surface and the second curved surface in the second passage. The drag in the diffusion room is therefore lower than the drag in the second passage. The powder and the fluid supplied to the diffusion room is supplied to the second passage after being diffused in the diffusion room because of the difference of drag. The second passage is provided between the first curved surface and the second curved surface in a conical shape and therefore formed in a slit shape extending in the circumferential direction around the center axis of the nozzle. Accordingly, uneven distribution of the powder and the fluid supplied from the diffusion room to the second passage is suppressed, and consequently, change in distribution of the ejected powder and fluid due to change in orientation of the nozzle is suppressed. Furthermore, clogging of the nozzle member with the powder is suppressed.

Although some embodiments of the present invention have been described, these embodiments are given by way of example and are not intended to limit the scope of the invention. These novel embodiments can be carried out in other various modes, and a variety of elimination, replacement, and modifications are possible without departing from the spirit of the invention. These embodiments and modifications are included in the scope and the spirit of the invention and fall within the scope of equivalents to the invention recited in the claims.

The invention claimed is:

1. A nozzle comprising:
a nozzle member including an end portion in a first direction, the nozzle member provided with a first passage configured to emit an energy beam from the end portion, a second passage surrounding the first passage and configured to eject powder and fluid from the end portion, a diffusion room spaced apart from the end portion in a second direction opposite to the first direction and configured to supply the powder and the fluid to the second passage, and a supply path configured to supply the powder and the fluid to the diffusion room;
a first inner surface included in the nozzle member and including a first curved surface in a conical shape having a diameter decreasing toward the end portion; and
a second inner surface included in the nozzle member, facing the first inner surface with a gap interposed, and including a second curved surface in a conical shape having a diameter decreasing toward the end portion, the second passage being formed between the first curved surface and the second curved surface, the diffusion room being formed between the first inner surface and the second inner surface, wherein
a distance between the first inner surface and the second inner surface in the diffusion room is longer than a distance between the first curved surface and the second curved surface in the second passage.

2. The nozzle according to claim 1, wherein
the diffusion room includes a plurality of spaces spaced apart from each other and disposed at regular intervals in a circumferential direction around a center axis of the nozzle member extending in the first direction, and
the supply path includes a plurality of supply holes each communicating with one of the plurality of spaces.

3. The nozzle according to claim 2, wherein the plurality of supply holes are disposed at regular intervals in the circumferential direction.

4. The nozzle according to claim 2, wherein a part of the second passage is positioned between the plurality of spaces.

5. The nozzle according to claim 2, wherein the nozzle member includes a plurality of first partitions positioned between the plurality of spaces and connected to at least one of the first inner surface and the second inner surface.

6. The nozzle according to claim 1, wherein a distance between the first inner surface and the second inner surface decreases toward the end portion in the diffusion room.

7. The nozzle according to claim 1, wherein the supply path is configured to supply the powder and the fluid to the diffusion room in a direction parallel to the second passage.

8. The nozzle according to claim 1, wherein the supply path is skew to a center axis of the nozzle member extending in the first direction.

9. The nozzle according to claim 1, wherein the nozzle member includes a plurality of second partitions connected to at least one of the first inner surface and the second inner surface, extending from the end portion, and disposed with a gap in a circumferential direction around a center axis of the nozzle member extending in the first direction.

10. An additive manufacturing apparatus comprising:
    the nozzle according to claim 1;
    an emission device configured to supply the energy beam to the first passage; and
    a supply device configured to supply the powder and the fluid to the supply path, wherein
    the nozzle is configured to melt or sinter the powder ejected from the end portion by the energy beam.

\* \* \* \* \*